Dec. 13, 1927.
H. A. WALKER
PORTABLE ELECTRIC LIGHT
Filed March 17, 1927
1,652,964
2 Sheets-Sheet 1
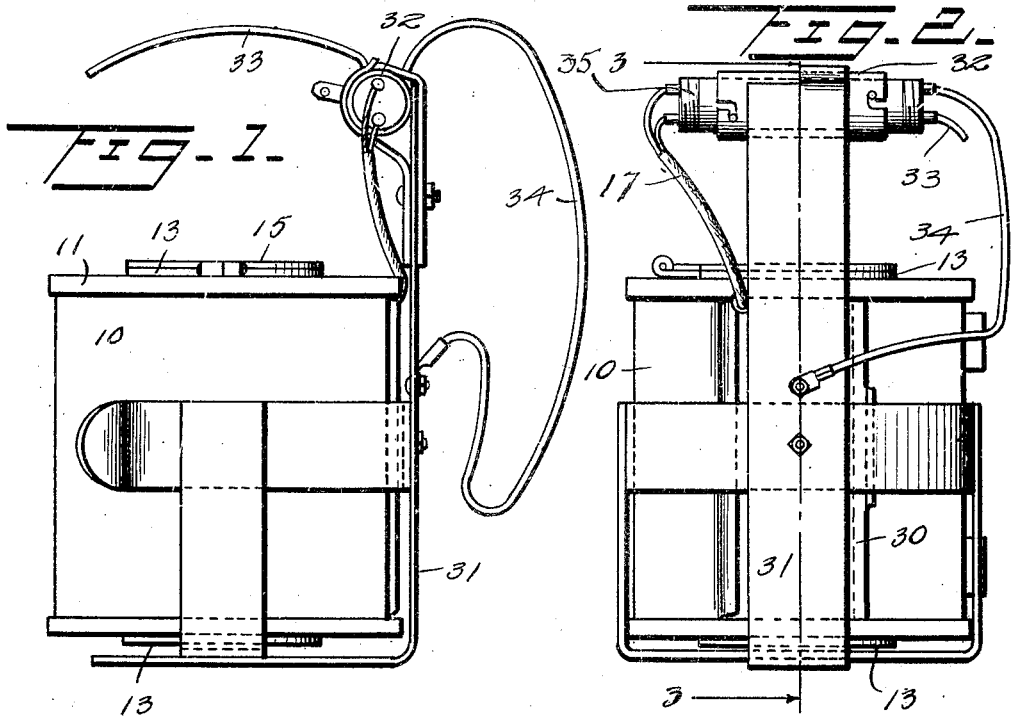
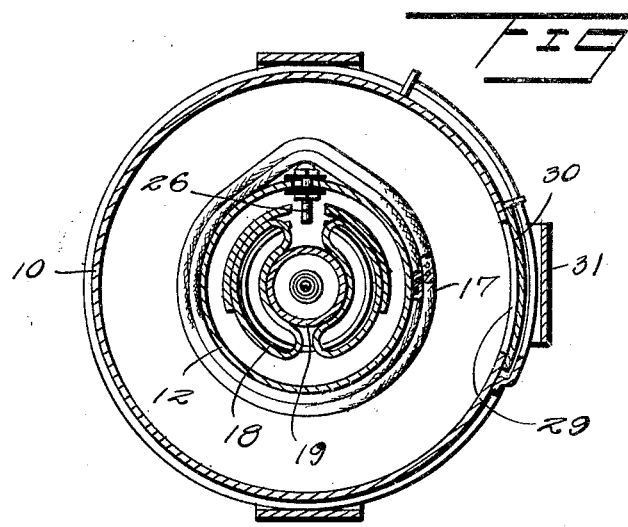
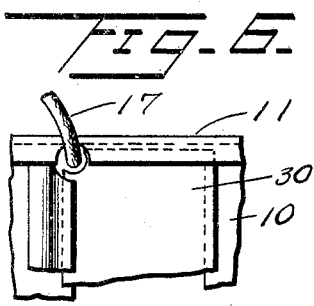
Inventor
H. A. Walker
By Watson E. Coleman
Attorney

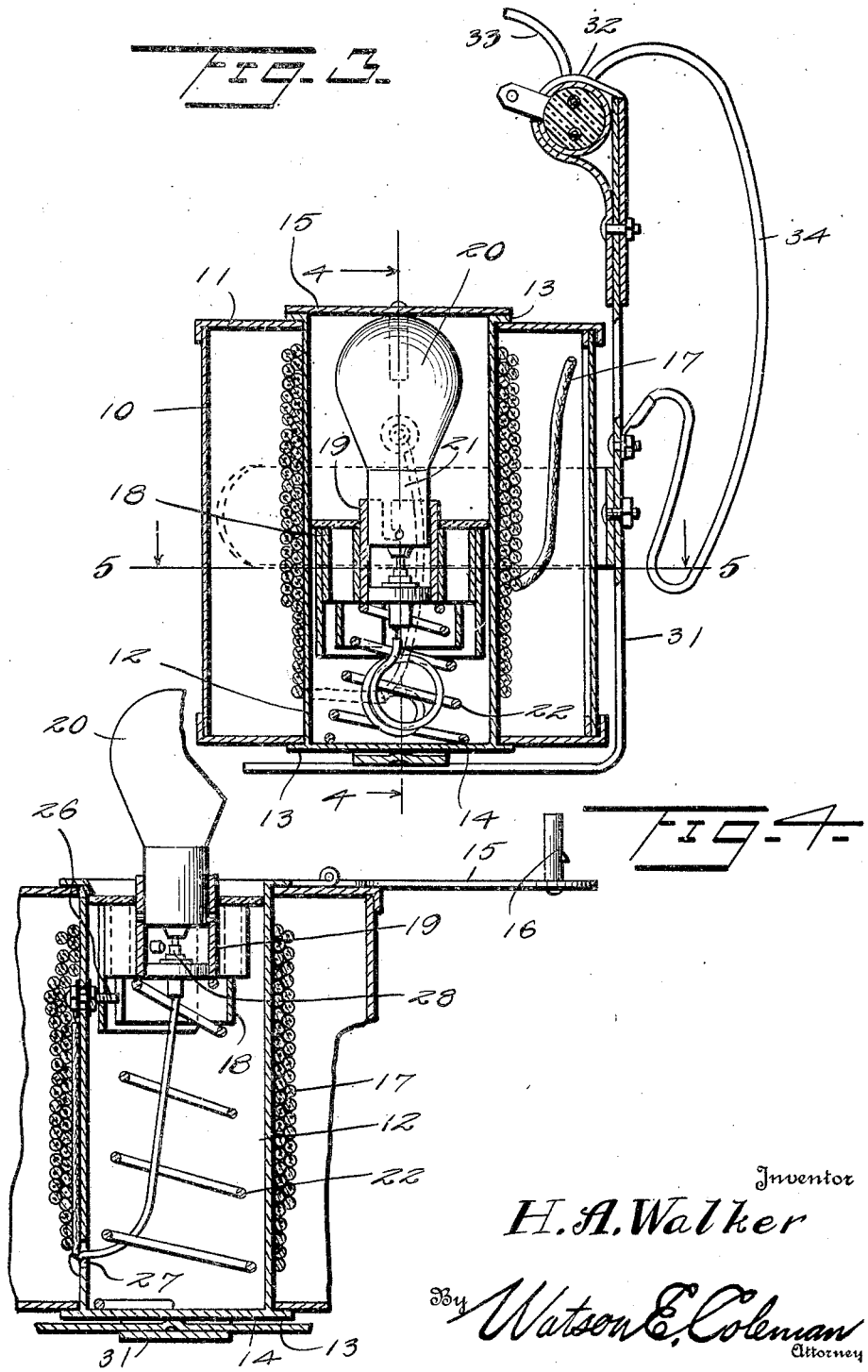

Patented Dec. 13, 1927.

1,652,964

UNITED STATES PATENT OFFICE.

HARVEY A. WALKER, OF BRINKMAN, OKLAHOMA, ASSIGNOR OF ONE-HALF TO DANIEL A. SUMMERS, OF BRINKMAN, OKLAHOMA.

PORTABLE ELECTRIC LIGHT.

Application filed March 17, 1927. Serial No. 176,177.

This invention relates to portable electric lights and more particularly to a device of this character especially adapted for use in connection with automobiles.

An important object of the invention is to produce a device of this character which may be normally mounted upon a bracket carried by the automobile and which derives its power from the battery of the automobile and which may be moved from its normal position to any position adjacent to the automobile, where it may be desired to employ the same.

A further object of the invention is to produce a device of this character having a reel upon which an extension cord is wound, this reel forming a housing for an illuminating element which may be either concealed within the housing or extended therefrom to inoperative position.

A further object of the invention is to provide a device of this character in which the movement of the illuminating element to its inoperative position disconnects the illuminating element from the source of current with which it is connected when in operative position.

A still further object of the invention is to provide a device of this character in which the reel has one open end through which the light may be extended and a closure for this open end, which retains the light in an inoperative position against the action of a spring, this closure, when in open position, providing a handle, by means of which the reel may be rotated.

These and other objects I attain by the construction shown in the accompanying drawings, wherein for the purpose of illustration is shown a preferred embodiment of my invention and wherein:—

Figure 1 is a side elevation of an extension light constructed in accordance with my invention and the bracket with which it is employed;

Figure 2 is a rear elevation thereof;

Figure 3 is a section on the line 3—3 of Figure 2;

Figure 4 is a section on the line 4—4 of Figure 3;

Figure 5 is a section on the line 5—5 of Figure 3;

Figure 6 is a detail view showing the manner in which the conducting cable is situated when the door of the reel housing is closed.

Referring now more particularly to the drawings, the numeral 10 indicates a reel housing, which is preferably cylindrical in form and has upper and lower end walls 11 provided with openings through which are extended the ends of a hollow cylindrical reel 12. The reel is provided at its ends with flanges 13 operating against the outer faces of the end walls 11 of the housing, so that the reel is held against longitudinal displacement. The lower end of the reel is closed, as at 14, by a permanent closure, while the upper end thereof has a hinged closure 15 provided with a snap catch 16 which, when the closure is swung to the open position, as illustrated in Figure 4, it may be employed as a handle, by means of which the reel may be rotated to rewind the conducting cord 17 upon the exterior surface thereof.

Slidable within the reel is a socket support 18, which provides a mounting for and is electrically connected to the socket 19 of a single contact electrical illuminating element 20. As is well known to those familiar with the art, this type of electrical illuminating element secures a second contact through the connection of its base 21 with the socket in which it is engaged. Extending between the bottom closure 14 of the reel and the reel mounting 18 is a spring 22, which constantly urges the reel mounting upwardly. The catch 16 is of sufficient strength to hold the reel mounting depressed against the action of the spring 22 when the cover 15 is swung to the closed position.

The reel conducting cord 17 is of the two-wire type and has one of the wires thereof connected to a contact 26 carried by the side wall of the reel 11 and insulated therefrom. The second wire of this conductor is let through the wall of the reel adjacent the bottom thereof, as at 27, and is connected to the contact element 28 of the socket 19. The contact element 26 has electrical engagement with the socket support 18 and accordingly with the socket, when the socket support is in its elevated position and the illuminating element is projected from the interior of the reel. It further serves as a means limiting movement of the socket support from the interior of the reel.

The casing 10 is preferably provided with a vertically extending opening 29 through which the outer end of the cable may be extended. This opening may be closed by a slidable door 30 when the light is not in use. A bracket 31, which may be secured to a suitable support upon the automobile, is preferably provided as a means for supporting the casing and reel when not in use. This bracket has preferably attached thereto at its upper end a connection block 32 providing a means for connecting the wires of the conductor 17 with the lead wires 33 to a source of current. Where the wiring system of the automobile is of the grounded circuit type, the bracket may additionally provide a ground contact 34, if so desired.

In the use of the light, if the light in its normal position will serve the necessary functions, all that is required is that the cap 15 be swung to the open position. This permits the illuminating element and socket support to move upwardly, so that contact is established and the illuminating element rendered effective. Where the light is needed at a distance, the casing is removed from the bracket and transported to the place where it may be desired and the cord 17 unwinds from the reel as the casing is removed. When the light is to be returned, the cable is rewound upon the reel, employing the latch 17 as a handle, the cover 15 closed, forcing the illuminating element into the interior of the reel and breaking the circuit thereof and the casing replaced upon the bracket.

The connection block 32 is preferably in the form of a socket in which is removably engaged the plug 35 with which the leads 17 are connected. This structure permits the lamp casing to be readily removed from the bracket, which is preferably located upon the dash of the vehicle and connected in any of the lamp sockets of the vehicle, so that the lamp may be extended to a greater distance than would be possible were the connection with the bracket permanent.

Since the construction hereinbefore set forth is capable of a certain range of change and modification without materially departing from the spirit of the invention, I do not limit myself to such specific structure except as hereinafter claimed.

I claim:—

1. In combination, a container, an electrical illuminating element therein, a spring urging the illuminating element from the casing, means normally preventing extension of the illuminating element from the casing and a normally open circuit for the illuminating element closed when said means is operated to permit extension of the illuminating element from the casing, the casing comprising a reel upon which the conducting cord forming a portion of the circuit of the illuminating element is wound.

2. In combination, a container, an electrical illuminating element therein, a spring urging the illuminating element from the casing, means normally preventing extension of the illuminating element from the casing and a normally open circuit for the illuminating element closed when said means is operated to permit extension of the illuminating element from the casing, the casing comprising a reel upon which the conducting cord forming a portion of the circuit of the illuminating element is wound, said means including a part forming a handle whereby the reel may be rotated to wind the cord thereon when the means is operated to permit the illuminating element to move to its extended position.

3. In combination, a casing, a reel rotatable in the casing and having one end thereof open, an electrical illuminating element socket support mounted interiorly of the reel, a spring urging the socket support toward the open end of the reel, a circuit for an illuminating element mounted in the socket completed when the socket support is projected a predetermined distance toward the open end of the reel, a cover for said open end engaging an illuminating element arranged in said socket to maintain the socket support out of circuit closing position when the cover is closed.

4. In combination, a casing, a reel rotatable in the casing and having one end thereof open, an electrical illuminating element socket support mounted interiorly of the reel, a spring urging the socket support toward the open end of the reel, a circuit for an illuminating element mounted in the socket completed when the socket support is projected a predetermined distance toward the open end of the reel, a cover for said open end engaging an illuminating element arranged in said socket to maintain the socket support out of circuit closing position when the cover is closed, the cover having a latch whereby it is maintained in closed position, said latch when the cover is in the open position providing a handle whereby the reel may be rotated.

5. In combination, a lamp casing including a lamp socket, a flexible lead for the lamp socket, a reel upon which the lead is wound, a bracket providing a support for the casing and having a connection block and a plug connected with the leads and engaging in a socket provided by the connection block.

In testimony whereof I hereunto affix my signature.

HARVEY A. WALKER.